United States Patent [19]

Gött et al.

[11] Patent Number: 4,580,458

[45] Date of Patent: Apr. 8, 1986

[54] POWER TRANSMISSION

[75] Inventors: Hans Gött; Josef Ritter; Gerhard Ritter; Klaus Ritter, all of Graz, Austria

[73] Assignee: EVG Entwicklungs- und Verwertungs-Gesellschaft m.b.H., Graz, Austria

[21] Appl. No.: 436,777

[22] Filed: Oct. 26, 1982

[30] Foreign Application Priority Data

Oct. 28, 1981 [AT] Austria ............................ 4583/81

[51] Int. Cl.⁴ .............................................. F16H 3/08
[52] U.S. Cl. ......................................... 74/359; 74/360; 74/688; 192/48.8
[58] Field of Search ............... 192/48.8; 74/360, 359, 74/346, 370, 688

[56] References Cited

U.S. PATENT DOCUMENTS

| | | | |
|---|---|---|---|
| 2,251,213 | 1/1941 | Lanphere | 74/346 |
| 2,261,898 | 11/1941 | Barkeij | 74/346 |
| 2,309,864 | 2/1943 | Patterson | 74/370 |
| 4,018,106 | 4/1977 | Vozumi et al. | 74/688 |
| 4,312,243 | 1/1982 | Gött et al. | 74/340 |

FOREIGN PATENT DOCUMENTS 80890050 5/1980 European Pat. Off. .

*Primary Examiner*—William F. Pate, III
*Assistant Examiner*—Shirish Desai
*Attorney, Agent, or Firm*—Marmorek, Guttman & Rubenstein

[57] ABSTRACT

The transmission comprises two pairs of aligned coaxial shafts (3,5,12,13) capable of being moved by way of a control relative to each other in an axial direction and having associated therewith at their respective facing ends or sides in each case a clutch disk (37,38,39,40). The shafts can be coupled in various combinations by way of a clutch body (2) disposed so as to be freely shiftable and rotatable between the two pairs of clutch disks.

In order to dispose the motor and the elements driven by it on the same side of the transmission, the first pair of coaxial shafts is formed from an extension (3) of the drive shaft (1) extending beyond the clutch element or body (2) and from a hollow shaft (5) concentrically surrounding this extension (3) and connected to it under a fixed transmission ratio. The second pair of coaxial shafts is formed from two shafts (12,13) disposed in front of the clutch body (2) and surrounding coaxially the drive shaft (1), where each of these shafts (12,13) is connected in each case at definite predetermined transmission ratios via a gear wheel (14,15) with a gear wheel (16,17) which in turn is coupled to or is capable of being coupled to the driven shaft (18).

9 Claims, 3 Drawing Figures

POWER TRANSMISSION

BACKGROUND OF THE INVENTION

The invention relates to a power transmission with two pairs of mutually aligned, coaxial shafts, which can be shifted relatively to each other in an axial direction. A clutch disk is disposed in each case at the ends of the shafts disposed toward each other and the shafts can be coupled in various combinations by way of a clutch body or element disposed so as to be freely movable and rotatable between the two pairs of clutch disks.

A transmission of this kind is known from the European Patent Application No. 80890050 (Publication No. 0019609). The shafts, which at the known transmission ratios are movable relative to each other by way of a control and are capable of being coupled via the central clutch body in various combinations, are disposed in an idler gear, which is connected to the drive shaft and the driven shaft of the transmission via gear wheels, where the drive shaft and driven shaft are disposed in alignment and are protruding on opposite sides of the transmission case. Such a constructed transmission is suitable for all those application cases where a disposition of the transmission is advantageous between the motor and the elements driven by the same.

It is an object of the invention to provide a transmission of the kind indicated such that the motor and the elements driven by it can be disposed on the same side of the transmission as it is, for example required at vehicles, where the wheels driven are in the immediate proximity of the motor, for example at cars with a front wheel drive and the engine disposed in the front.

SUMMARY OF THE INVENTION

The construction in accordance with the present invention for achieving the object comprises that the first pair of coaxial shafts is formed by an extension of the drive shaft beyond the clutch body and by a hollow shaft concentrically surrounding this extension, where the two coaxial shafts are connected to each other via a gear wheel in each case and an idler gear with a preset transmission ratio, and that the second pair of coaxial shafts is formed by two shafts disposed in front of the clutch body and coaxially surrounding the drive shaft or drive axle, where each of these shafts is connected via a gear wheel with another gear wheel which is coupled to, or is capable to be coupled to the drive shaft or drive axle at a fixed transmission ratio.

According to an advantageous further embodiment a free-wheel assembly is provided between the drive shaft and each gear wheel, which is coupled to the gear wheel or is capable of being coupled to the gear wheel. The drive shaft can only be driven in a forward direction by way of the free-wheel assembly. Such a transmission is characterized by particularly low inner resistances, since in this embodiment only that hollow shaft connected to the driven shaft via gear wheels is in motion, which hollow shaft serves as the power transmission at the point in time considered between the freely shiftable and rotatable clutch body and the driven shaft, whereas in contrast the driven shaft via gear wheels is interrupted via the free-wheel assembly associated with the drive shaft or axle, such that the second hollow shaft is not taken along idling by the driven shaft or axle.

However, the possibility to be able to interrupt the drive connection between the driven shaft or axle and the hollow shaft connected to it via gear wheels by way of a free-wheel assembly is at times also a disadvantage, and, in fact, then, when, for example, the engine is to be employed for braking in a vehicle running downwardly. If, however, a friction clutch capable of being engaged and disengaged and capable of bridging the free-wheel assembly or rendering it ineffective, is associated with each free-wheel assembly, then the free-wheel assembly can be rendered ineffective over certain desired time intervals whenever this is desired.

The transmission is advantageously constructed for employment according to the purpose of the transmission in the power transmission path of a vehicle drive such that between the driven shaft and the one gear wheel adapted to be coupled with it, there is provided a hollow shaft freely rotatable with respect to the drive or axle, and that in addition an engageable and disengageable, preferably positively locking clutch is provided, which as desired, can be coupled to this hollow shaft or to a gear wheel, which is driven by an idler gear reversing the direction of rotation, in order to make possible a reversing of the direction of motion of the vehicle.

Finally, it is advantageous in a motor vehicle transmission according to the present invention to provide a backstop such that the vehicle can be secured against rolling down on a sloped road during parking.

BRIEF DESCRIPTION OF THE DRAWING

The invention is now described in detail by way of an embodiment with reference to the drawings. There is shown in FIG. 1 the principal construction of a transmission according to the invention, and in FIG. 2 an embodiment of a transmission according to the invention, and in FIG. 3 and embodiment of a back gearing arrangement which reverses the revolving direction.

DESCRIPTION OF THE PREFERRED EMBODIMENTS

Figure 1:
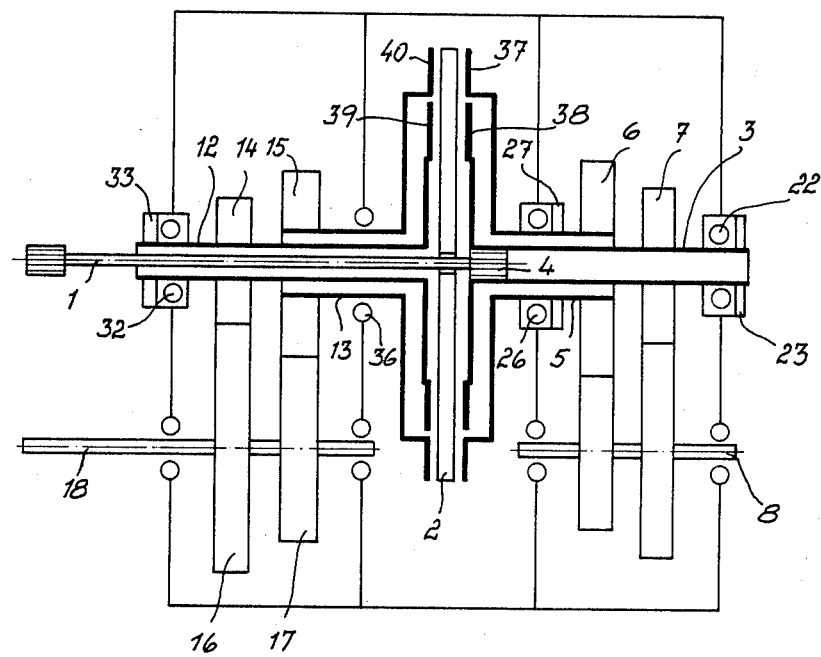

A clutch element or body 2 is disposed at a drive shaft or axle 1 and is supported so as to be freely shiftable and rotatable. The drive shaft 1 comprises an extension 3 extending beyond the clutch body 2. The extension 3 is positively lockingly connected to the rest of the drive shaft 1 via a toothing 4 in order to allow, if necessary, to disassemble the transmission at this point and thereby to render the clutch linings easily accessible, such that an exchange of worn clutch linings against new linings is possible.

A hollow shaft 5 surrounds coaxially the extension 3 of the drive shaft 1. The hollow shaft 5 supports at one end a gear wheel 6 and the extension 3 of the drive shaft 1 carries near its outer end a gear wheel 7 in the same manner. The two gear wheels 6 and 7 are engaged with the gear wheels of an idler gear 8 in such a manner, that the two coaxial shafts 3,5 are connected at a fixedly predetermined transmission ratio to each other.

Two additional hollow shafts 12,13 coaxially surround the drive shaft 1. Each of these hollow shafts 12,13 is provided with a gear wheel 14,15. The gear wheels 14,15 are engaged with two further gear wheels 16,17, which are supported at a second drive shaft 18 and which, in turn, are coupled to, or are capable of being coupled to the second driven shaft or axle 18.

The extension 3 of the drive shaft 1 is disposed shiftably in the coupling case according to the embodiment shown. The bearing 22 is supported against an annular shaped piston 23 for this purpose. The piston 23 forms the separating wall between two annular shaped chambers 24,25 shown only in FIG. 2, where the piston surface limiting the chamber 25 is larger than the surface of the piston 23 limiting the chamber 24.

The chambers 24 and 25 are provided with pressure medium via pressure medium lines shown as dot-dash lines where the construction is provided in such a manner that the chamber 24 remains continuously filled with the pressurized pressure medium and where, in contrast, the pressure in chamber 25 can be built up or again be reduced to zero as desired. The piston 23 pushes the bearing 22 and with it the extension 3 of the drive shaft 1 in the direction of the clutch body 2 upon simultaneous pressurization of the two chambers 24 and 25 with the pressure medium. As soon as the pressure has been reduced again in chamber 25, then the extension member 3 of the drive shaft or axle returns into its original position under the effect of the pressure in chamber 24.

The hollow shaft 5 is supported in a bearing 26 and the hollow shaft 12 is supported in a bearing 32 in exactly the same manner. These bearings are also shiftable by way of pistons 27 and 33, where according to FIG. 2 again two annular chambers 28 and 29, respectively, and 34 and 35, respectively, are associated with each piston. The three chambers 24,28, and 34 and, respectively, chambers 25,29, and 35 correspond to each other in their way of being effective. Only the hollow shaft 13 is supported with a non-shiftable bearing 36.

The hollow shafts 5,12, 13 and the extension member 3 of the drive shaft 1 carry at their ends or sides disposed toward the clutch body 2 in each case a clutch body, which can be coupled to the clutch body 2 for power transmission. Thus the hollow shaft 5 supports the clutch body 37, the extension 3 of the drive shaft 1 supports the clutch body 38, the hollow shaft 12 supports the clutch body 39 and finally the hollow shaft 13 supports the clutch body 40.

Nothing is changed at the essentials of the invention if in case of the non-shiftably supported shaft 13 of the embodiment there would be for example the extension 3 of the drive shaft 1 or the hollow shaft 5 be for example the extension 3 of the drive shaft 1 or the hollow shaft 5 be non-shiftable and instead the hollow shaft 13 would be shiftable. At any rate it is essential only that the piston cross-section face of the annular chamber 25,29 or 35, which shift the shafts corresponding to them in the engagement position with the central clutch body 2, is larger at that shaft, which is disposed coaxially to the fixed shaft, as compared to the piston cross-section face in that of the two other annular shaped chambers, in order to assure that upon pressurization of an annular chamber on each side of the central clutch body 2 this clutch body 2 is shifted away from the freestanding clutch body with certainty and cannot unintentionally engage the fixed position clutch body with a power transmitting connection.

The clutch body 40 is disposed at the non-shiftable supported hollow shaft 13 according to the embodiment shown and thus it is in fixed position in the transmission case. Therefore, the piston cross-section in the annular chamber 35, which is associated with the hollow shaft 12, which is coaxial in the embodiment shown with the fixed position hollow shaft 13, has to be larger than the piston cross-section face in each of the annular chambers 25 or 29, such that upon simultaneous pressurization of the chamber 35 and one of the chambers 25 or 29 the central clutch body is removed from the fixed position clutch body 40 and cannot enter into a power transmitting connection without this being intended.

Figure 2:
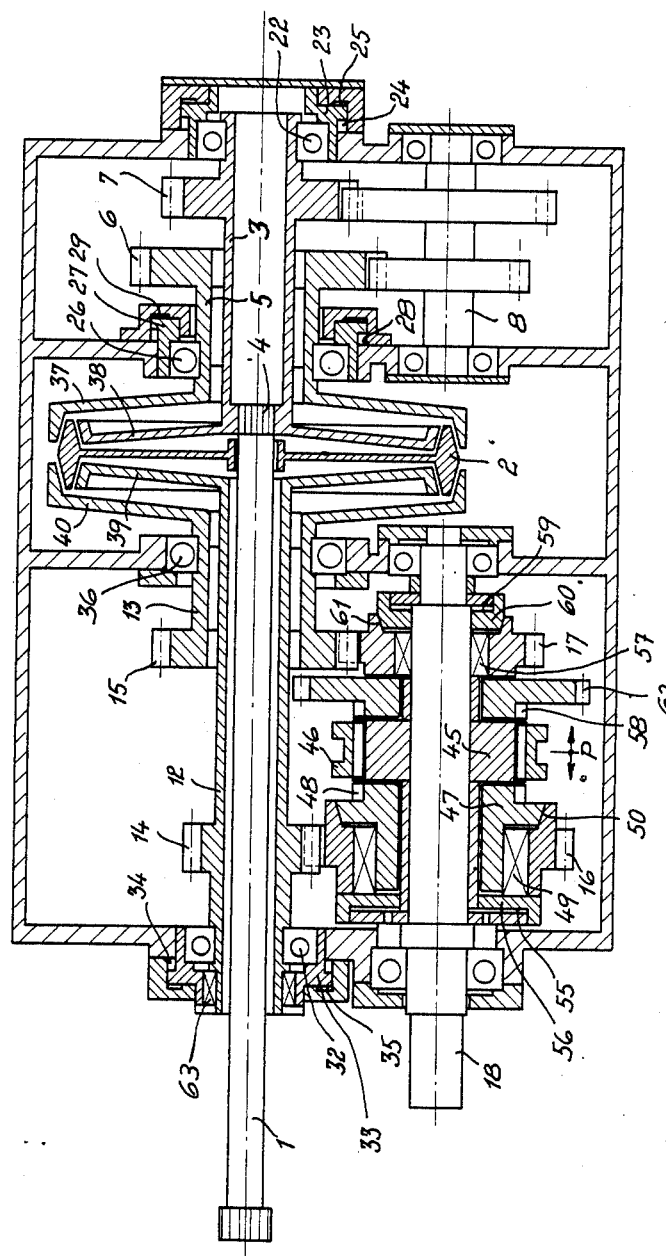

A wheel 45 is rigidly connected to the driven shaft 18 according to the embodiment of FIG. 2. This wheel is provided with an external toothing only indicated, which is positively lockingly engaged with the interior toothing of a lock ring 46 surrounding the wheel. The lock ring 46 is shiftable in the direction of the double arrow P by switching means not shown here.

A hollow shaft 47, which surrounds the driven shaft or axle 18 and which is supported freely rotatable relative to the driven shaft 18, is positively locking connectable to the inner toothing of the lock ring 46, if the lock ring 46 is shifted toward the hollow shaft 47. The hollow shaft 47 is then also positively lockingly connected to the wheel 45 and this is capable of taking along the driven shaft or axle 18 at a rotary motion.

A free-wheel assembly 49 is disposed between the hollow shaft 47 and the gear wheel 16 enclosing this hollow shaft. The free-wheel assembly 49 is provided such that it takes the hollow shaft 47 only then along at a rotary motion, if the gear wheel 16 moves relative to the hollow shaft 47 in the direction of a forward rotation.

Coacting friction coupling surfaces 50 are provided at the gear wheel 16 and at the hollow shaft 47 in order to bridge, if necessary, the free-wheel assembly and thereby rendering the same ineffective. The shifting is provided by filling of an annular chamber 55 with a pressure medium, where the part formed as a cylinder 56, which borders in part the chamber 55, is moved toward the coupling surfaces 50 while taking along the gear wheel 16.

The power transmission via the gear wheel 17 is constructed in a very similar way; the free-wheel 57 connects in this case however the gear wheel 17 immediately to the drive shaft 18. Again a chamber 59 fillable with pressurized medium is provided; the cylinder 60 movable in the axial direction of the driven shaft 18 is provided with coupling surfaces 61, which can engage complementary coupling surfaces at the gear wheel 17, in order to be able to bridge the free-wheel assembly 57, if desired. For this purpose, the cylinder 60 is connected fixedly against rotation to the driven shaft 18.

Figure 3:
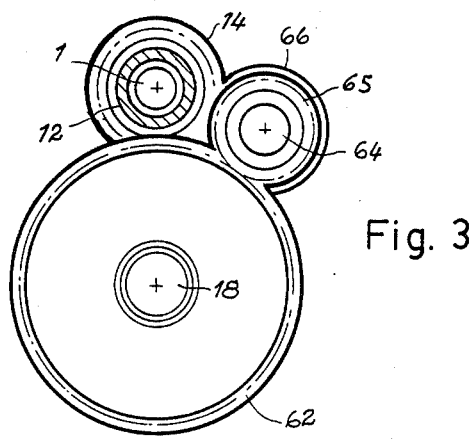

A gear wheel 62 is connected to the gear wheel 14 via an idler gear as shown in FIG. 3. The gear wheel 62 freely and rotatably disposed on the driven shaft 18 therefore rotates always in the direction of a backward rotation of the driven shaft 18 and can be connected so as to be positively locking via an outer toothing 58 to the lock ring 46 and therefore also to the wheel 45 and to the driven shaft 18.

Finally, the hollow shaft 12 can be secured against backward rotation via a backstop 63. Thereby it becomes possible to secure a vehicle on sloping territory against rolling away by a suitable setting of the lock ring 46.

The power flow in the transmission runs via the following element:
Forward gears:
1. gear: 1-4-3-7-8-6-5-37-2-39-12-14-16-49-47-48-46-45-18 (16-50-47-48)
2. gear: 1-4-3-7-8-6-5-37-2-40-13-15-17-57-18 (17-61-60-18)
3. gear: 1-4-3-38-2-39-12-14-16-49-47-48-46-45-18 (16-50-47-48)
4. gear: 1-4-3-38-2-40-13-15-17-57-18 (17-61-60-18)

The values in brackets in each case indicate the paths bridging the free-wheel assemblies.

Reverse gears:
1. gear: 1-4-3-7-8-6-5-37-2-39-14-idler gear-62-58-46-45-18
2. gear: 1-4-3-38-2-39-14-idler gear-62-58-46-45-18

The idler gears referred to in the context of the power transmission of the reverse gears are in each case idler gears shown and disposed between the wheels 14, and 62, by way of which a rotation opposite to the forward rotation of the driven shaft 18 is imparted to the gear wheel 62.

We claim:

1. A power transmission comprising in combination
   a drive axle,
   a freely rotatable clutch element having two major sides and being shiftably disposed on said drive axis,
   a first pair of shafts shiftable with respect to one another in an axial direction and including a drive axle extension member and a hollow shaft member surrounding said drive axle extension member, said shafts being coaxially aligned with said drive axle, each shaft including a corresponding clutch disk facing one side of said clutch element,
   a second pair of shafts surrounding said drive axle, each shaft of said second pair of shafts including a corresponding clutch disk facing the other side of said clutch element,
   said clutch disks being selectively shiftable in said axial direction,
   a first set of two gear wheels and an idler gear coupling said shafts of said first shaft pair to one another at a first selectable transmission ratio,
   a second set of two gear wheels coaxial with said drive axle, and
   a third set of two gear wheels coupling said shafts of said second shaft pair to one another at a second selectable transmission ratio, each of said third set of gear wheels being at least couplable to said drive axle,
   whereby said shafts may be coupled to one another in various selectable transmission ratio combinations.

2. The power transmission as claimed in claim 1, wherein the gear wheels of said first set are coaxial with said drive axle.

3. The power transmission as claimed in claim 1, wherein said drive axle is a first drive axle, and further comprising a second drive axle and free-wheeling means, each gear wheel of said third set of gear wheels being coupled to said free-wheeling means so that said second drive axle is drivable only in a forward sense of rotation.

4. The power transmission as claimed in claim 3, wherein said free-wheeling means includes first and second free-wheeling assemblies coupled to said third set of gear wheels, respectively.

5. The power transmission as claimed in claim 4, further comprising first and second friction clutches engageable with, and disengageable from said first and second free-wheeling assemblies, respectively, so as to respectively render a corresponding free-wheeling assembly effective or ineffective.

6. The power transmission as claimed in claim 1, wherein said drive axle is a first drive axle and further comprising
   a second drive axle,
   a hollow shift disposed between said second drive axle and one of the gear wheels of said third set, said hollow shaft being freely rotatable with respect to said second drive axle,
   reversing means reversing the rotation of said first drive axle,
   a toothed wheel coupled to said reversing means, and
   clutch means selectably engageable with, and disengageable from said hollow shaft and said toothed wheel, respectively.

7. The power transmission as claimed in claim 6, wherein said clutch means is a positively locking clutch.

8. The power transmission as claimed in claim 1, wherein said drive axle rotates in a forward sense of rotation, and further comprising locking means coupled to a gear wheel of said first set inhibiting rotation of said gear wheel in a reverse sense of rotation.

9. The power transmission as claimed in claim 3, wherein said second drive axle extends parallel with said first drive axle.

* * * * *